United States Patent [19]
Ng

[11] Patent Number: 5,445,347
[45] Date of Patent: Aug. 29, 1995

[54] AUTOMATED WIRELESS PREVENTIVE MAINTENANCE MONITORING SYSTEM FOR MAGNETIC LEVITATION (MAGLEV) TRAINS AND OTHER VEHICLES

[75] Inventor: Joseph S. Ng, Montebello, Calif.

[73] Assignee: Hughes Aircraft Company, Los Angeles, Calif.

[21] Appl. No.: 62,862

[22] Filed: May 13, 1993

[51] Int. Cl.$^6$ ............................................. B61L 1/00
[52] U.S. Cl. .......................... 246/169 R; 364/424.04
[58] Field of Search .......... 246/167 R, 169 R, 169 D, 246/169 S; 364/424.03, 424.04

[56] References Cited

U.S. PATENT DOCUMENTS

| | | | |
|---|---|---|---|
| 3,639,371 | 2/1972 | McNeill | 246/169 R X |
| 3,784,813 | 1/1974 | Ryan | 246/169 R |
| 4,989,146 | 1/1991 | Imajo | 364/424.04 |
| 5,146,568 | 9/1992 | Flaherty et al. | 395/325 |
| 5,185,700 | 2/1993 | Bezos et al. | 364/424.04 |
| 5,260,967 | 11/1993 | Schilling | 375/1 |
| 5,265,832 | 11/1993 | Wesling et al. | 246/169 R |

FOREIGN PATENT DOCUMENTS

| | | | |
|---|---|---|---|
| 2587959 | 4/1987 | France | 246/169 R |
| 128701 | 6/1986 | Japan | 246/169 R |

OTHER PUBLICATIONS

"Railway Cybernetics"; George; *Railway Signalling and Communications;* Jan., 1968; pp. 24–31.

Broadwater, S. P., et al. "Maintenance Processor/Time Stress Measurement Device (MP/TSMD) Use For Failure Trend Analysis." pp. 228–238, 1992 Proceedings Annual Reliability and Maintainability Symposium.

Popyack, L. J., et al., "Time Stress Measurement Devices For Enhancement of Onboard Bit Performance." pp. 6-1-6-6; AGARD Conference Proceedings 521.

McCallum, M., et al., "Environmental Measurement and Recording Techniques Utilizing A Time Stress Measurement Device (TSMD) Institute of Environmental Sciences", 1990 Proceedings.

Honeywell. "Environmental Stress Monitoring Device (ESMD). El Advance Information". 1992 Honeywell, Inc.

Westinghouse. Product Data Sheet. "Time Stress Management."

*Primary Examiner*—Robert J. Oberleitner
*Assistant Examiner*—S. Joseph Morano
*Attorney, Agent, or Firm*—W. K. Denson-Low

[57] ABSTRACT

A status monitor and diagnostic unit (SMDU) (12) is provided in every car (14,16) of a magnetic levitation (MAGLEV) train (18) or other vehicle, and includes sensors (38,40,42,44,48,52) for monitoring the operational status or condition of the car (14,16). Network status interface units (NSIU) (22) are provided at stations (24) and at other fixed locations (26) through which the train (18) passes. The NSIUs (22) transmit polling signals which cause the SMDUs (12) to transmit data signals representing the operational status of the cars (14,16) to the NSIUs (22) via a spread-spectrum time-division-multiple-access (TDMA) network (30) when the train (18) passes proximate thereto. The NSIUs (22) relay the data signals to a maintenance control center (MCC) (28) via a wide-area-network (WAN) (32). The MCC (28) generates a prognosis of the operating conditions of the cars (14,16) in accordance with the data signals, and schedules maintenance actions based on the prognosis. The MCC (28) also includes a computerized maintenance data base (88) which can be accessed by technicians at remote repair facilities.

20 Claims, 6 Drawing Sheets

AUTOMATED WIRELESS PREVENTIVE MAINTENANCE MONITORING SYSTEM FOR MAGNETIC LEVITATION (MAGLEV) TRAINS AND OTHER VEHICLES

BACKGROUND OF THE INVENTION

1. Field of the Invention

The present invention generally relates to the art of vehicle maintenance, and more specifically to an automated wireless preventive maintenance monitoring system for a vehicle such as a magnetic levitation train.

2. Description of the Related Art

Magnetic levitation (MAGLEV) trains are currently being developed and placed into service, and offer numerous advantages over conventional diesel and electric powered trains. Whereas the engine and cars of conventional trains roll on wheels which are guided by tracks, MAGLEV trains are levitated above guideways and propelled by magnetic fields.

An overview of a typical MAGLEV train system is presented in an article entitled "TRANSRAPID 06 II PERFORMANCE AND CHARACTERISTICS" by L Miller, International Conference on MAGLEV and Linear Drives, Las Vegas, May 1987, pp. 155-162.

Since the cars of MAGLEV trains do not make rolling contact with the guideways while traveling, frictional forces are minimal and operational speeds of up to 500 km/hr are attainable with low strain on the guideways. MAGLEV trains are extremely smooth and quiet in operation, and do not create environmental pollution. They are also are lighter in weight, more reliable, and easier to maintain than conventional trains.

MAGLEV trains, as well as virtually all other vehicles, must be properly maintained to ensure reliable operation. Well planned and careful maintenance is especially important in high speed vehicles such as trains which are used for public transportation, since a catastrophic failure can cause a tragic accident with enormous consequences.

Maintenance is conventionally performed by making periodic inspections to determine the operational condition of a vehicle, and repairing or replacing components which have malfunctioned or are excessively worn.

Preventive maintenance is also conventionally performed, which includes replacing components at intervals which are calculated as a percentage of their potential operating lifetime, or the number of operating hours after which the components can realistically be expected to malfunction or be worn beyond tolerance.

This percentage can be as low as 50% of the potential operating lifetime in the case of major components which are critical for the safe operation of a vehicle. These particular components also tend to be relatively expensive.

The effectiveness and efficiency of conventional vehicle maintenance are limited in several respects. Replacement of components at predetermined intervals is inefficient in that many of these components could have operated safely and reliably for a longer period of time. Premature replacement of components is also undesirable in terms of vehicle down time and maintenance cost.

Since maintenance inspections are performed periodically, a defective component can fail between scheduled inspections in a length of time which is significantly shorter than its replacement lifetime. This can cause a vehicle to break down catastrophically or at least require being taken out of service for repair.

Unscheduled maintenance is very expensive, since the vehicle must be repaired in the field or transported to a repair facility. In the case of a public transportation vehicle, a breakdown can cause a disruption in passenger service, causing inconvenience to the passengers and discouraging them from using public transportation. The danger of a tragic accident caused by an equipment malfunction cannot be overemphasized.

SUMMARY OF THE INVENTION

A status monitor and diagnostic unit (SMDU) is provided in every car of a magnetic levitation (MAGLEV) train or other vehicle, and includes sensors for monitoring the operational status or condition of the car. Network status interface units (NSIU) are provided in stations and at other fixed locations through which the train passes.

The NSIUs transmit control signals which poll the SMDUs and cause the SMDUs to transmit data signals representing the operational status of the cars to the NSIUs via a spread-spectrum time-division-multiple-access (TDMA) network when the train passes proximate thereto. The NSIUs relay the data signals to a maintenance control center (MCC) via a wide-area-network (WAN).

The MCC generates a prognosis of the operating conditions of the cars based on the data received from the SMDUs and schedules maintenance actions based on the prognosis. The MCC also includes a computerized technical data base which can be accessed by technicians at remote repair facilities.

The present system overcomes the drawbacks of conventional maintenance systems, increases the safety and reliability of the train or other vehicle, and increases the maintenance efficiency while reducing cost. Rather than perform maintenance inspections at predetermined intervals, the present invention performs inspections continuously in near real time. This greatly increases the probability that impending malfunctions can be detected, and preventive action taken before the malfunctions actually occur.

The reliability and safety of the vehicle are improved to the point where the possibility of a catastrophic malfunction is extremely low. This eliminates breakdowns and the expensive unscheduled maintenance required to place malfunctioning vehicles back in service. Passengers will feel that the system is safe and dependable, and will use it rather than traveling in personal automobiles. This is especially beneficial in reducing environmental pollution.

Components are replaced when sensor data indicate that they are actually worn out or prone to malfunction. This extends the service lives of the components to, for example, 90% of their potential operating lifetimes, rather than approximately 50% as in the prior art. The increased efficiency and reduced cost of vehicle maintenance provided by the present invention are substantial.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
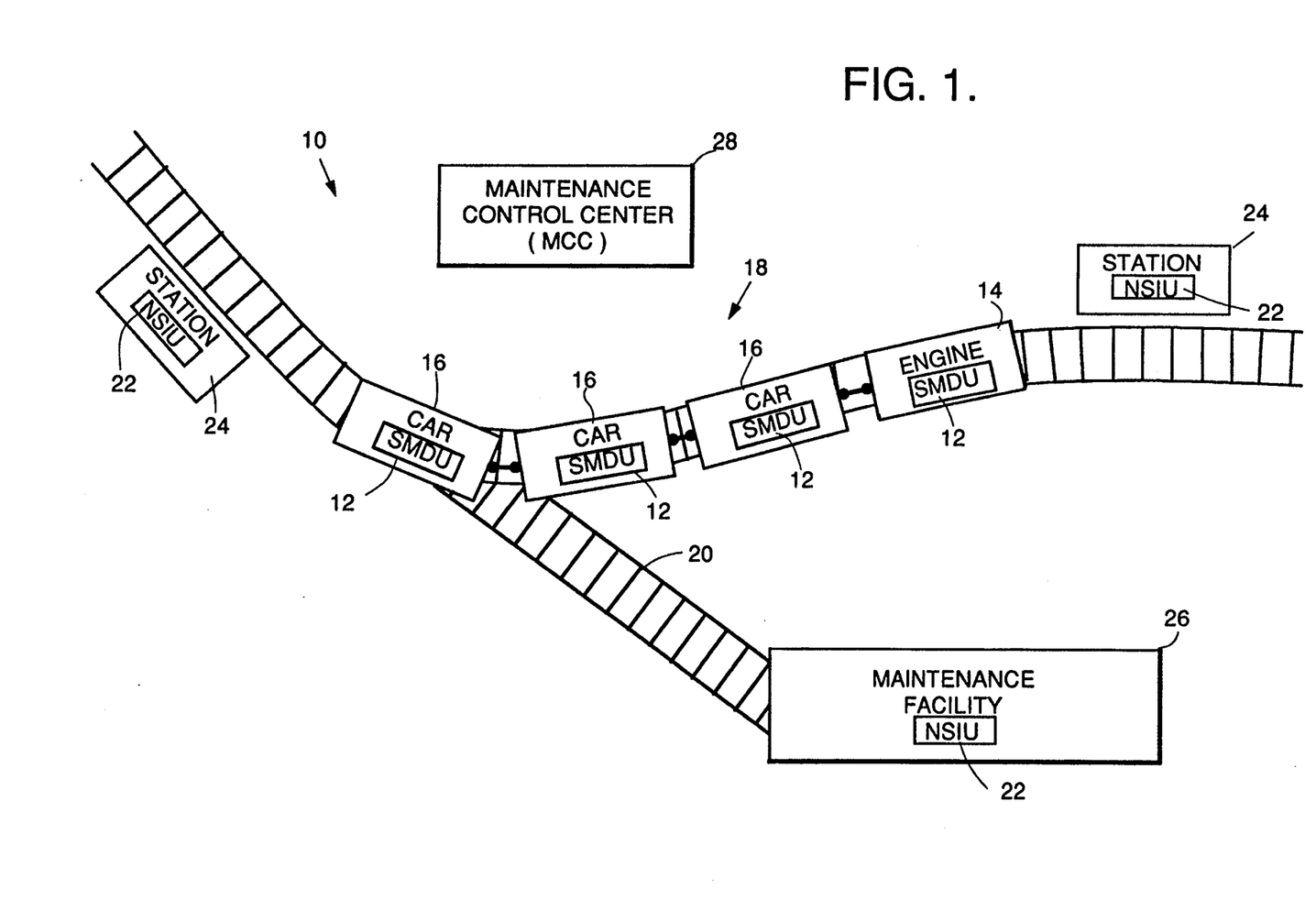
FIG. 1 is a simplified pictorial view of a magnetic levitation system equipped with an automated wireless vehicle preventive maintenance monitoring system (AWVPMMS) embodying the present invention.

An automated wireless vehicle preventive maintenance monitoring system (AWVPMMS) 10 embodying the present invention is illustrated in FIG. 1. A system monitor and diagnostic unit (SMDU) 12 is provided in the engine 14 and in each car 16 of a magnetic levitation (MAGLEV) train 18 which travels along a guideway 20.

Although the present invention is especially suitable for the MAGLEV train 18, it is not so limited. An automated preventive system embodying .the invention can be employed for managing the maintenance of numerous other types of vehicles, such as conventional trains, busses, fleet automobiles or taxicabs, trucks, airplanes, military vehicles, etc.

A network status interface unit (NSIU) 22 is provided at each fixed station 24 through which the train 18 passes, and also at other facilities such as a repair shop 26. A maintenance control center (MCC) 28 is provided at a suitable location which is remote from the NSIUs 22.

Figure 2:
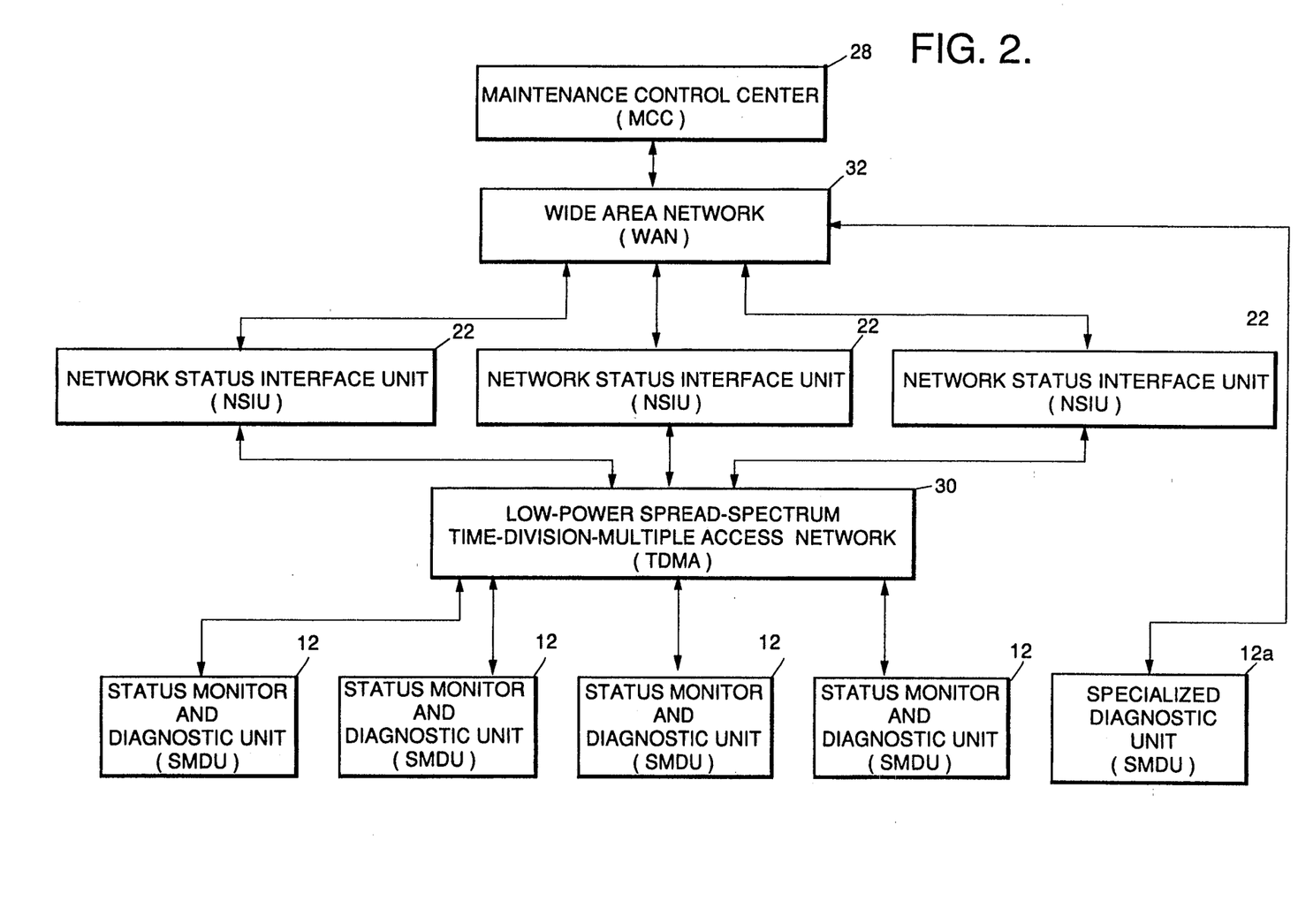
FIG. 2 is a block diagram of the AWVPMMS.

As illustrated in FIG. 2, the SMDUs 12 are interconnected with the NSIUs 22 by a wireless low-power spread spectrum time-division-multiple-access (TDMA) network 30, whereas the NSIUs 22 are interconnected with the MCC 28 by a wide-area-network (WAN) 32. The WAN 32 can utilize land lines, microwave or satellite links as appropriate. If desired, fixed facilities such as power distribution centers can be provided with specialized SMDUs 12a which communicate with the MCC 28 via the WAN 32.

Figure 3:
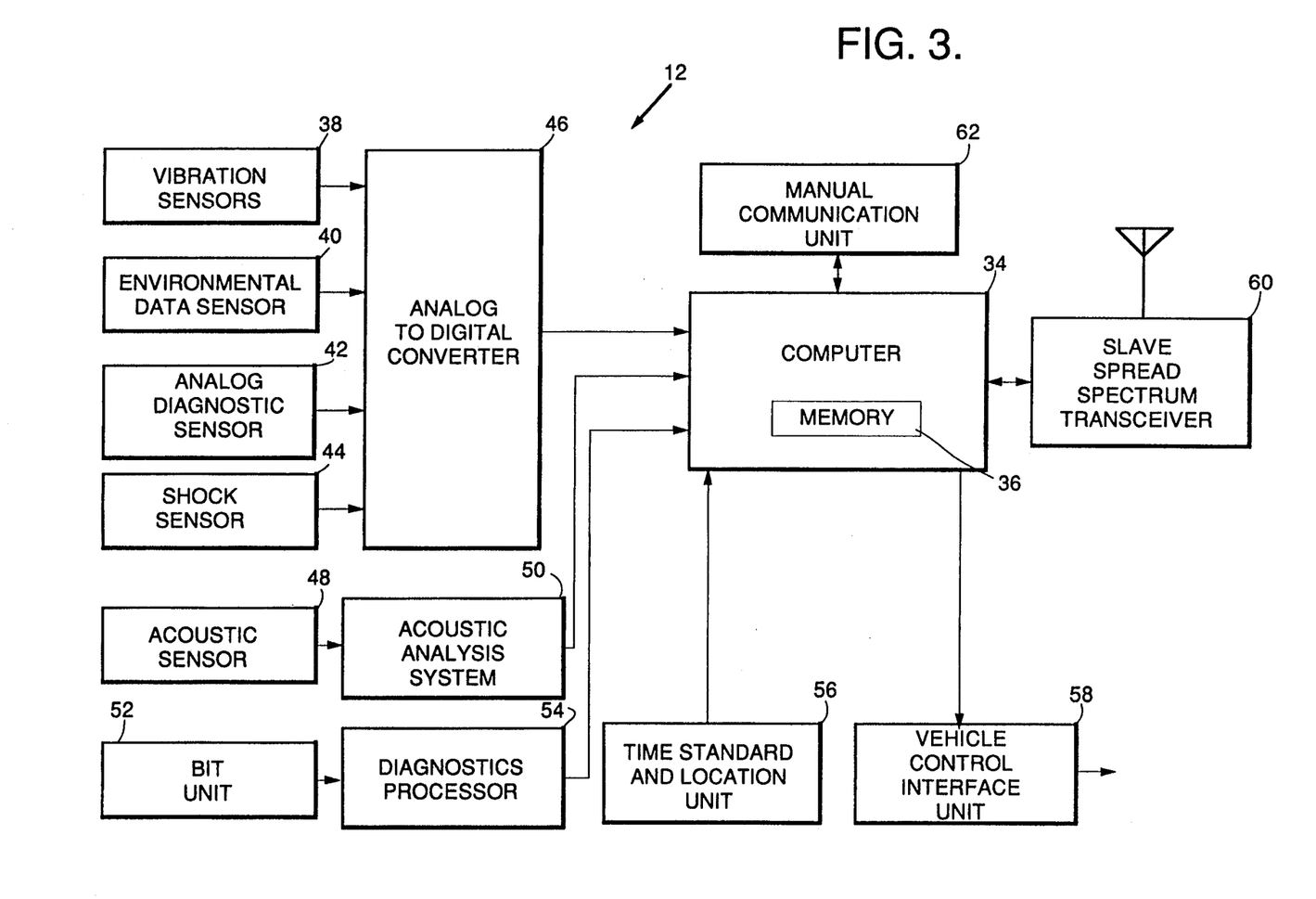
FIG. 3 is a block diagram of a status monitor and diagnostic unit of the AWVPMMS.

An SMDU 12 is illustrated in FIG. 3, and includes a microprocessor or computer 34 having a memory 36. Although not illustrated in detail, the computer 34 includes a central processing unit, timing circuitry, software operating program, input-output unit and other components which are conventionally found in general purpose computers.

The SMDU 12 further includes a number of sensors for sensing the operating condition or status of the engine 14 or car 16 in which the SMDU 12 is installed. The sensors include vibration sensors 38, environmental data sensors 40, analog electrical sensors 42 and shock sensors 44 which feed data to the computer 34 through an analog-to-digital converter 46.

An acoustic sensor 48 is connected to an acoustic analysis system 50, which feeds data representing the output of the sensor 48 to the computer 34. The engine 14 and car 16 each have a built-in test (BIT) unit 52 which provides digital data representing the electrical operation of the respective vehicle. A diagnostics processor 54 formats the output of the BIT unit 52 and feeds representative data to the computer 34.

A time standard and location unit 56 feeds data representing the current time and approximate location of the train 18 on the guideway 20 to the computer 34. A vehicle control interface unit 58 connects the computer 34 to the operational controls of the train 18. A low-power, spread spectrum time-division-multiple-access transceiver (TDMA) 60 transmits data from the SMDU 12 to the NSIUs 22, whereas a manual communication unit 62 enables the vehicle operator to communicate via the transceiver 60 under control of the computer 34.

Figure 4:
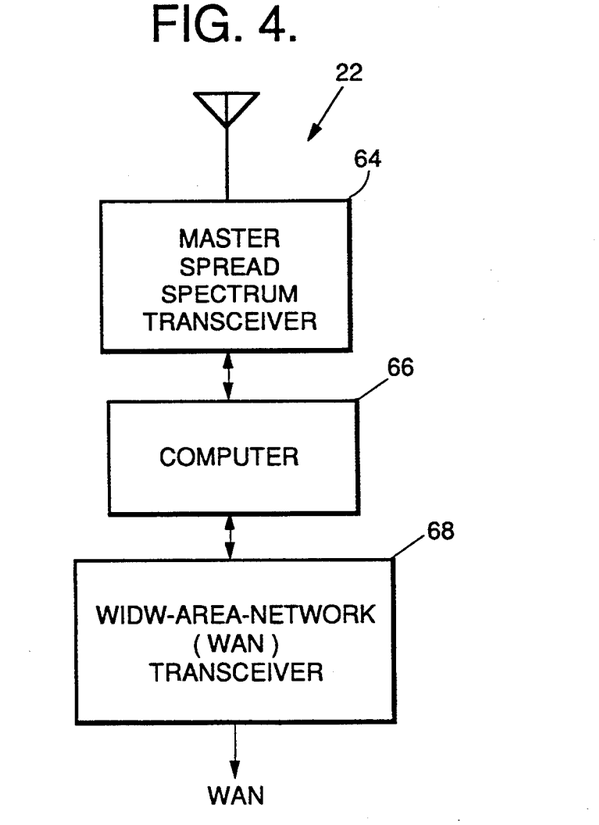
FIG. 4 is a block diagram of a network status interface unit of the AWVPMMS.

As illustrated in FIG. 4, each NSIU 22 includes a TDMA transceiver 64 which is connected to a computer 66. The transceivers 60 of the SMDUs 12 and the transceivers 64 of the NSIUs 22 constitute the TDMA network 30 illustrated in FIG. 2. The transceivers 64 are master units, whereas the transceivers 60 are slave units. The computer 66 is also connected to a WAN transceiver 68.

The spread-spectrum TDMA network 30 is a low-power system which can currently be operated in the United States without a government license. Such a network has an operating range of $\frac{1}{4}$ to $\frac{1}{2}$ mile. An overview of spread spectrum communication is presented in a textbook entitled "SPREAD SPECTRUM SYSTEMS" by R Dixon, John Wiley & Sons, New York 1984, pp. 1–14.

Although the network 30 can be implemented using conventional single-frequency communication within the scope of the invention, spread-spectrum communication is preferable in that it offers the advantages of network security and resistance to interference and jamming. It can also operate reliably in an electromagnetic environment.

Figure 5:
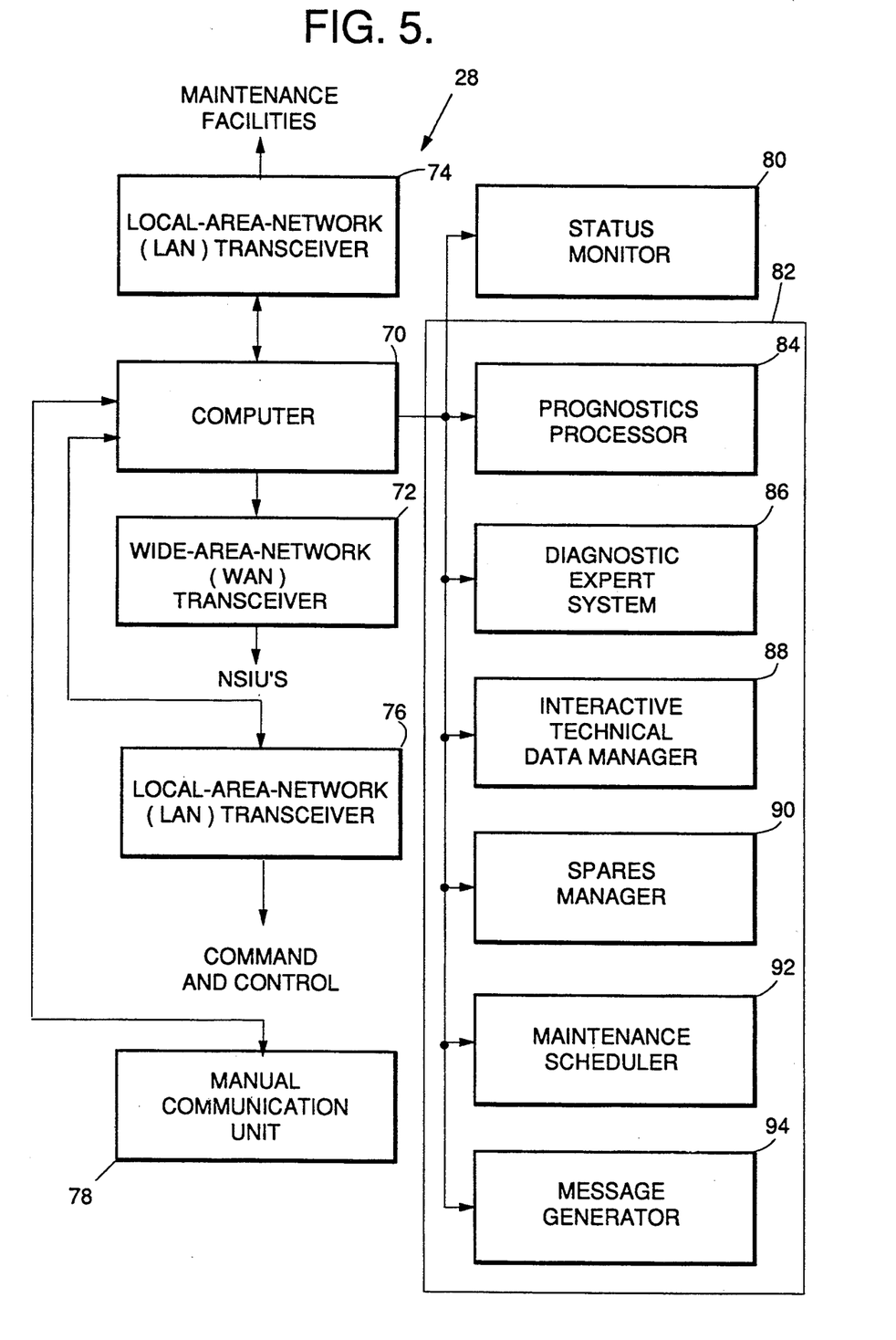
FIG. 5 is a block diagram of a maintenance control center of the AWVPMMS.

The MCC 28 is illustrated in FIG. 5, and includes a computer 70 which is connected to a WAN transceiver 72. The transceiver 72 of the MCC 28 and the transceivers 68 of the NSIUs 22 constitute the WAN network 32 illustrated in FIG. 2. The computer 70 can also be interconnected with one or more maintenance facilities (not shown) via a local-area-network (LAN) transceiver 74, and with the command and control system (not shown) of the train 18 via a LAN transceiver 76. Further illustrated is a manual communication unit 78 which enables personnel at the MCC 28 to communicate by voice over the transceivers 72, 74 and 76.

A status monitor 80 is connected to the computer 70 for displaying the operating condition of the train 18 and other information. A mass memory 82 including hard drives, file servers or the like (not shown) is connected to the computer 70. Software programs stored in the memory 82 include a prognostics processor 84, a diagnostic expert system 86, an interactive technical data manager 88, a spares manager 90, a maintenance scheduler 92 and a message generator 94.

Figure 6:
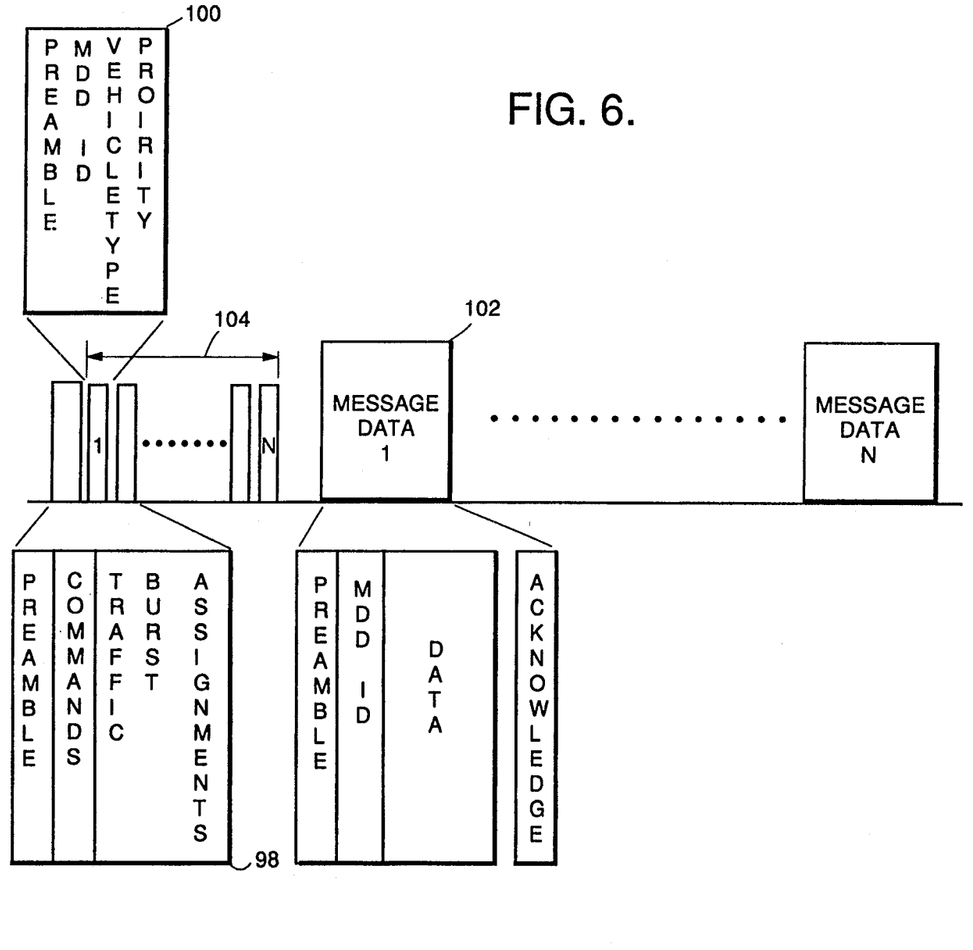
FIG. 6 us a time division multiple access (TDMA) frame structure for practicing the present invention.

In operation, the sensors in the SMDUs 12 continuously monitor the operating conditions of engine 14 and cars 16 of the train 18, and store data signals representing the sensed operating conditions in the SMDU memories 36. As illustrated in FIG. 6, the NSIUs 22 continuously transmit polling signals in the form of control messages 98. If the train 18 is out of range of all of the NSIUs 22, the control messages 98 are not received by the SMDUs 12, and no further action occurs.

When the train 18 passes proximate to one of the stations 24 or the maintenance facility 26, a control message 98 is received by the transceivers 60 in the SMDUs 12. Upon receipt of the control message 98, each SMDU computer 34 randomly selects a TDMA message time slot and transmits a network entry message 100 in a network entry subframe 104 to the NSIU 22 via the transceivers 60 identifying the SMDU 12 by SMDU ID and vehicle type. The SMDUs 12 transmit their data signals in the form of data messages 102 to the NSIU 22 in the time slots assigned in the network entry subframe 104, and turn off.

A number of SMDUs 12 can transmit network entry messages to the NSIU 22 asynchronously. The NSIU 22 will process only one network entry message 100 at a time, and continue until each transmitting SMDU 12 has been assigned a time slot and turned off. The NSIU 22 relays the data signals to the MCC 28 via the WAN transceiver 72.

There are commonly 16–64 TDMA message time slots for data transfer as designated in each network entry message subframe 104. If two SMDU computers 34 randomly select the same time slot, the computer 66 in the NSIU will not be able to process a network entry message 100 from either computer 34. When this occurs, the computers 34 in the associated SMDUs 12 randomly select other time slots during the next network entry message subframe 104 until the computer 66 in the NSIU 22 assigns a time slot in the control message 98 to the associated SMDUs 12 to cause them to stop transmitting the network entry message 100.

The MCC 28 receives and analyzes the data signals from the NSIU 22 to determine the operating condition of the train 18. If the train 18 is operating normally, no action will be taken unless scheduled maintenance is due. However, if the data signals indicate that the performance of one or more components of the train 18 are degrading or operating abnormally, the condition is analyzed and appropriate maintenance action is scheduled.

If the abnormality is serious enough as to cause a probable breakdown of the train 18 or an accident, the MCC 28 transmits signals via the WAN network 32, NSIU 22 and TDMA network 30 to the train 18 for controlling the train 18 to either stop, or to proceed immediately to the nearest maintenance facility. This can be done using data signals, and/or manually by transmitting voice messages to the vehicle operator. The message generator 94 of the MCC 28 stores a number of messages which can be transmitted to the train 18 for display on the manual communication units 62.

The MCC 28 also sends a message to the maintenance facility via the LAN 74 informing it that the train 18 will be arriving and the nature of the maintenance action to be taken.

If the condition of the train 18 is such that one or more components are determined to become worn beyond tolerance or may malfunction in the near future, but not imminently or in a dangerous manner, the MCC 28 schedules an appropriate maintenance action for the train 18, and sends messages to the train 18 and maintenance facility indicating the required maintenance action and the time at which it is to be performed.

The sensors for sensing the operating condition of the train 18 or other vehicle are selected depending on the type and construction of the particular vehicle. If the vibration signatures, acoustic signatures, environmental conditions and/or electrical characteristics change over a period of time, it is usually a positive indication that the operating condition of the vehicle is becoming degraded and that a failure condition is developing.

The vibration sensors 38 sense the vibration signature of the vehicle and compare it with a predetermined baseline. Increased vibration usually indicates that the structural integrity of the vehicle is degrading. The vibration signature is converted from time domain to frequency domain using a fast-Fourier-transform (FFT), and stored in the memory 36 of the respective SMDU 12 in a predetermined data format including the magnitude of each selected frequency component.

The vibration sensors 38 preferably sense vibrations in the following components of the MAGLEV train 18.
 1. Suspension system components including springs, shock absorbers and/or active damping system.
 2. Landing wheel assembly, suspension struts or support skids.
 3. Levitation magnets.
 4. Guidance magnets.
 5. Propulsion system.
 6. Superconducting magnetic refrigeration system.
 7. Braking system.

For aircraft, vibration in the following components are sensed.
 1. Engine.
 2. Transmission, propellers or turbine rotors.
 3. Landing gear.
 4. Braking system.

The main components to sense for vibration in automotive vehicles are as follows. 1. Suspension system components including springs, shock absorbers and/or active damping system. 2. Engine. 3. Drive train components including transmission, clutch and drive wheels. 4. Braking system.

The acoustic sensors 48 sense the acoustic signature of the vehicle, and the acoustic analysis system 50 produces data signals in a manner similar to the vibration sensors 38. Deviations of the acoustic signature from the baseline usually indicate developing problems in rotating machinery, such as bearing wear or lubricant breakdown.

The acoustic sensors 48 preferably sense the acoustic signatures of the following components of the MAGLEV train 18.
 1. Suspension system components including springs, shock absorbers and/or active damping system.
 2. Landing wheel assembly, suspension struts or support skids.
 3. Propulsion system.
 4. Superconducting magnetic refrigeration system.
 5. Braking system.

For aircraft, the acoustic signatures of the following components are sensed.
 1. Engine.
 2. Transmission, propellers or turbine rotors.
 3. Landing gear.
 4. Braking system.
 5. Fuselage, wing, tail.

The main components to sense for acoustics in automotive vehicles are as follows.
 1. Suspension system components including springs, shock absorbers and/or active damping system.
 2. Engine.
 3. Drive train components including transmission, clutch and drive wheels.
 4. Braking system.

The environmental data sensors 40 sense temperature, humidity, pressure and other appropriate variables. Generally, an increase in temperature is a precursor of an electrical or mechanical failure. Deviations in fluid pressure indicate an impending failure of a hydraulic system.

The following environmental conditions are preferably sensed in the MAGLEV train 18.

1. Temperature and humidity of the superconducting magnets.
2. Temperature, humidity and barometric pressure of the superconducting magnet refrigeration system.
3. Temperature, humidity and barometric pressure of the propulsion system.
4. Electromagnetic interference emissions within control systems.
5. Temperature of the braking system.

The following environmental conditions are sensed in aircraft.
1. Engine temperature.
2. Temperatures of the transmission and propellers or turbine rotors.
3. Icing on the wing and tail structures.
4. Pressures in the hydraulic system.
5. Temperature of the braking system.

The following environmental conditions are sensed in automotive vehicles.
1. Engine temperature.
2. Temperatures of the drive train components including the transmission, clutch and drive wheels.
3. Temperature of the braking system.

The analog diagnostic sensors 42 electrical sense voltages and currents in the vehicle. Deviations from baseline values indicate degradation of electrical, mechanical and structural components.

For the MAGLEV train 18, the following analog electrical parameters are sensed.
1. Voltage and current of levitation magnets.
2. Voltage and current of guide magnets.
3. Voltage and current of the superconducting magnet refrigeration system.
4. Voltage and current of the propulsion system.

The electrical parameters to be sensed for other types of vehicles depend on the particular application.

The status monitor 80 of the MCC 28 as illustrated in FIG. 5 receives and displays the operating condition data transmitted by the SMDUs 12 for evaluation by the maintenance personnel. All train and fixed facility failures are correlated to equipment serial number. The status data is continually updated and sent to the prognostics processor 84 and to the MAGLEV command and control system via the LAN network 76. The status monitor 80 and computer 70 also control all communications within the system 10.

The prognostic processor 84 is programmed to predict expected failures in time to take corrective action to prevent them from becoming operational problems. This is accomplished by continuously comparing baseline data signatures with near real time data from the SMDUs 12. Robust statistical trending algorithms are preferably implemented to analyze failures in all components in which degradation of performance can be monitored and followed. Vibration signature analysis utilizes background noise cancellation and digital signal processing techniques.

Imminent failures are displayed on the status monitor 80 so that they can be evaluated by supervisory personnel to prevent generation of false alarms.

The diagnostic expert system 86 provides an on-line troubleshooting capability for maintenance personnel throughout the system 10, and can be accessed through the NSIUs 22 or the LAN network 74 using a portable computer terminal. A functional model of normal system operation is stored in a knowledge base in the system 86, and an inference engine or reasoning mechanism using artificial intelligence generates an interactive procedure to verify correct operation.

The maintenance personnel perform tests and compare the results with data contained in the model to determine correct operation. The system 86 allows journeyman level maintenance personnel to perform in a manner comparable to expert technicians in order to keep the train 18 running.

The interactive technical data manager 88 provides access to technical data for service personnel in the field, and can be accessed in a manner similar to the diagnostic expert system 86. The technical data is stored on a file server. This streamlines the maintenance process by eliminating bulky technical manuals and ensures that up-to-date documentation is available throughout the system 10.

Maintaining the database is also much easier and more efficient than maintaining paper documentation because a change need only be entered at the file server. The technical data manager 88 uses hypertext/hypermedia display techniques to achieve an interactive display-on-demand information system. Access to and navigation through the maintenance data is rapid and efficient.

The spares manager 90 provides efficient management of spare parts required for maintenance. It allows maintenance personnel to fully control and report on the status of equipment, parts and supplies used in maintenance of the train 18. It provides spare part usage reports including cost, and flags major parts usage for analysis. The spares manager 90 also provides physical inventory checklists, parts on order status, equipment and parts cross references, and identification of subsystems using specific parts. Inclusion of the spares manager 90 enables complete integration of all maintenance functions at the MCC 28.

The maintenance scheduler 92 provides efficient management and coordination of maintenance personnel as well as providing reports on failure trends. It allows maintenance to be planned rather than constantly dealing with unexpected events. The scheduler 92 provides a graphical display of failure trends so that detailed analysis can be performed. It also provides status reports to management on repair costs, history, parts usage, maintenance distribution, downtime, catastrophic failures and trends.

The MAGLEV train 18 requires an effective maintenance management system that minimizes operating and maintenance costs, and improves system availability. The present automated preventive maintenance system 10 satisfies these requirements by anticipating failures and providing maintenance personnel with the information needed for repairs. The system 10 uses prognostics, artificial intelligence diagnostics, and electronic information delivery technology to provide an efficient maintenance management and support system.

Maintenance personnel require relatively little formal training, and their proficiency is greatly enhanced. Special support equipment requirements are substantially reduced or eliminated because built-in test diagnostics and maintenance data are embedded in the MAGLEV train system. System availability is maximized and unscheduled repairs are precluded, thereby minimizing removal of the MAGLEV train 18 or other vehicle from service.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

I claim:

1. An automated maintenance system for a vehicle, comprising:
   a mobile unit provided in the vehicle for sensing the operational condition of the vehicle and transmitting electrical data signals corresponding thereto;
   a fixed receiver unit for automatically receiving said data signals when the vehicle passes proximate thereto; and
   a base unit for processing said data signals received by the receiver unit to determine said operational condition, and to predict subsequent operational problems associated with said condition, said base unit comprising a prognostic unit for determining said operational condition and for predicting the problems in said conditions and a diagnostic unit for scheduling preventive maintenance action for the vehicle in accordance with said operational condition and said predicted problems.

2. A system as in claim 1, further comprising:
   a fixed maintenance unit which is located remotely from the base unit for performing maintenance on the vehicle; and
   a telecommunication system for transmitting said scheduled maintenance action from the diagnostic unit to the maintenance unit.

3. A system as in claim 1, further comprising:
   a fixed maintenance unit which is located remotely from the base unit for performing maintenance on the vehicle;
   a maintenance information data base provided at the base unit; and
   a telecommunication system for enabling the data base to be accessed from the maintenance unit.

4. A system as in claim 1, in which the base unit further comprises a message generator for generating messages in accordance with said operational condition and transmitting said messages through the receiver unit to the vehicle.

5. An automated maintenance system for a train including a plurality of cars, comprising:
   a plurality of mobile units provided in the cars for automatically sensing the operational conditions of the cars and independently transmitting electrical data signals corresponding thereto respectively in response to polling signals;
   a plurality of fixed receiver units located at stations through which the train passes for automatically transmitting polling signals to the mobile units, and receiving said data signals when the cars pass proximate thereto;
   a base unit for processing said data signals received by the receiver units to determine said operational conditions, said base unit comprising a prognostic unit for determining said operational conditions of the cars in accordance with said data signals; and a diagnostic unit for scheduling maintenance actions for the cars in accordance with said operational conditions.

6. A system as in claim 5, in which each mobile unit comprises:
   a sensor for sensing a parameter representing said operational condition;
   a computer for generating said data signals in a predetermined format in accordance with said parameter;
   a memory for storing said data signals; and
   a transmitter for transmitting said data signals from the memory to the receiver units.

7. A system as in claim 5, in which:
   the mobile units transmit respective network entry messages identifying themselves to the receiver unit in response to said polling signal; and
   the receiver unit assigns time slots in a time division multiple access queue to the mobile units in response to said network access messages and controls the mobile units to transmit said data signals in said time slots respectively.

8. A system as in claim 5, in which each mobile unit comprises a sensor for sensing a vibration signature of the car as representing said operational condition.

9. A system as in claim 5, in which each mobile unit comprises a sensor for sensing an acoustical signature of the car as representing said operational condition.

10. A system as in claim 5, in which:
    each mobile unit comprises a spread-spectrum time-division-multiple-access (TDMA) slave transceiver for transmitting said data signals; and
    each receiver unit comprises a spread-spectrum TDMA master transceiver for receiving said data signals..

11. A system as in claim 5, in which:
    each receiver unit is located remotely from the base unit and comprises a wide-area-network (WAN) transceiver for relaying said data signals to the base unit; and
    the base unit comprises a WAN receiver for receiving said data signals from the receiver units.

12. A system as in claim 5, further comprising:
    a fixed maintenance unit which is located remotely from the base unit for performing maintenance on the train; and
    a telecommunication system for transmitting said scheduled maintenance actions from the diagnostic unit to the maintenance unit.

13. A system as in claim 5, further comprising:
    a fixed maintenance unit which is located remotely from the base unit for performing maintenance on the train; and
    a maintenance information data base provided at the base unit; and
    a telecommunication system for enabling the data base to be accessed from the maintenance unit.

14. A system as in claim 5, wherein the prognostic unit predicts subsequent problems associated with said operational condition and the diagnostic unit automatically schedules preventive maintenance in accordance with the predicted problems.

15. An automated maintenance system for a train including a plurality of cars, comprising:
    a plurality of mobile units provided in the cars for automatically sensing the operational conditions of the cars and independently transmitting electrical data signals corresponding thereto respectively in response to polling signals;
    a plurality of fixed receiver units located at stations through which the train passes for automatically transmitting polling signals to the mobile units, and receiving said data signals when the cars pass proximate thereto; and a base unit for processing said data signals received by the receiver unit to determine said operational conditions, said base unit further comprising a message generator for generating messages in accordance with said operational conditions and transmitting said messages through the receiver units to the cars as the train passes proximate thereto.

16. An automated maintenance system for a vehicle, comprising:

a mobile unit provided in the vehicle for automatically sensing the operational condition of the vehicle and transmitting electrical data signals corresponding thereto in response to a polling signal;

a fixed receiver unit for automatically transmitting the polling signal and receiving said data signals when the vehicle passes proximate thereto; and a base unit for processing said data signals received by the receiver unit to determine said operational condition, and to automatically schedule maintenance action in accordance with said operational condition.

17. A system as in claim 16, wherein the base unit predicts subsequent failures associated with said operational condition and schedules preventive maintenance action in order to take corrective action prior to failure.

18. A system as in claim 17, wherein the base unit transmits an emergency signal to the vehicle when it predicts a serious failure is imminent.

19. An automated maintenance system for a vehicle, comprising:

a sensor for sensing an operational signature of the vehicle;

a mobile unit provided in the vehicle for transmitting electrical data signals corresponding to the signature;

a fixed receiver unit for automatically receiving said data signals when the vehicle passes proximate thereto; and a base unit for comparing the signals to a predetermined characteristic signature to determine the operational condition of the vehicle, said base unit predicting subsequent failures from the comparison of the sensed and characteristic signatures, and scheduling preventive maintenance action in order to correct the vehicle prior to failure.

20. A system as in claim 19, wherein the sensor is a vibrational or acoustical sensor.

* * * * *